United States Patent [19]

Ohran et al.

[11] Patent Number: 5,649,152
[45] Date of Patent: Jul. 15, 1997

[54] METHOD AND SYSTEM FOR PROVIDING A STATIC SNAPSHOT OF DATA STORED ON A MASS STORAGE SYSTEM

[75] Inventors: Richard S. Ohran, Provo; Michael R. Ohran, Orem, both of Utah

[73] Assignee: Vinca Corporation, Orem, Utah

[21] Appl. No.: 322,697

[22] Filed: Oct. 13, 1994

[51] Int. Cl.⁶ .................. G06F 12/00; G06F 12/08
[52] U.S. Cl. .................. 395/441; 395/489; 395/488; 395/182.03; 395/182.04
[58] Field of Search .................. 395/412, 413, 395/417, 419, 462, 441, 440, 488, 489, 183.18, 468, 469, 470, 492, 182.03, 182.04; 371/10.2

[56] References Cited

U.S. PATENT DOCUMENTS

| | | | |
|---|---|---|---|
| 3,054,560 | 9/1962 | Hartley | 235/151 |
| 3,303,474 | 2/1967 | Moore et al. | 340/172.5 |
| 3,444,528 | 5/1969 | Lovell et al. | 340/172.5 |
| 3,533,082 | 10/1970 | Schnabel et al. | 340/172.5 |
| 3,544,477 | 12/1970 | Heller | 252/301.1 |
| 3,557,315 | 1/1971 | Kobus et al. | 179/15 |
| 3,602,900 | 8/1971 | Delaigue et al. | 340/172.5 |
| 3,623,014 | 11/1971 | Doelz et al. | 340/172.5 |
| 3,636,331 | 1/1972 | Amrehn | 235/151.12 |
| 3,665,173 | 5/1972 | Bouricius et al. | 235/153 |
| 3,681,578 | 8/1972 | Stevens | 235/153 |
| 3,725,861 | 4/1973 | Hancock | 340/146.1 |
| 3,735,356 | 5/1973 | Yates | 340/172.5 |
| 3,754,211 | 8/1973 | Rocher et al. | 340/146.1 |
| 3,760,364 | 9/1973 | Yamauchi et al. | 340/172.5 |
| 3,761,884 | 9/1973 | Avsan et al. | 340/172.5 |
| 3,771,137 | 11/1973 | Barner et al. | 340/172.5 |
| 3,803,568 | 4/1974 | Higashide | 340/213 R |
| 3,810,119 | 5/1974 | Zieve et al. | 340/172.5 |
| 3,810,121 | 5/1974 | Chang et al. | 340/172.5 |
| 3,812,469 | 5/1974 | Hauck et al. | 340/172.5 |
| 3,820,085 | 6/1974 | Zelinski | 340/172.5 |
| 3,824,547 | 7/1974 | Green et al. | 340/146.1 BA |
| 3,828,321 | 8/1974 | Wilber et al. | 340/172.5 |
| 3,864,670 | 2/1975 | Inoue et al. | 340/172.5 |
| 3,865,999 | 2/1975 | Spitaels | 179/175.2 R |
| 3,889,237 | 6/1975 | Alferness et al. | 340/172.5 |
| 3,959,638 | 5/1976 | Blum et al. | 235/153 AK |
| 4,012,717 | 3/1977 | Censler et al. | 340/172.5 |
| 4,051,461 | 9/1977 | Hashimoto et al. | 364/900 |
| 4,073,005 | 2/1978 | Parkin | 364/200 |
| 4,076,961 | 2/1978 | Holsinger et al. | 179/2 DP |
| 4,099,241 | 7/1978 | Ossfeldt | 364/200 |
| 4,118,772 | 10/1978 | Takada | 364/119 |
| 4,141,066 | 2/1979 | Keiles | 364/119 |
| 4,152,764 | 5/1979 | Conners et al. | 364/200 |

(List continued on next page.)

OTHER PUBLICATIONS

Lyon, J. "Tandem's Remote Data Facility," *IEEE*, Spring 1990.

Moline, H. et al., "Issues in Disaster Recovery," *IEEE*, Spring 1990.

*Primary Examiner*—Jack B. Harvey
*Assistant Examiner*—Ario Etienne
*Attorney, Agent, or Firm*—Workman Nydegger Seeley

[57] ABSTRACT

A system and method for providing a static snapshot, or image, of data stored on a mass storage system are disclosed. First, a preservation memory is cleared and a virtual device is created. Whenever a write is to be performed on the mass storage system, a check is made of the preservation memory to determine if it contains a block associated with the mass storage write address. If there is not, a copy of the block in the mass storage system at the block write address is placed in the preservation memory. Whenever a read is to be performed on the virtual device, a check is made of the preservation memory to determine if it contains a block associated with the virtual device read address. If there is such a block, that block is returned as the result of the virtual device read. Otherwise, the block at the virtual device block read address is returned as the result.

25 Claims, 5 Drawing Sheets

Microfiche Appendix Included
(2 Microfiche, 123 Pages)

U.S. PATENT DOCUMENTS

| | | | |
|---|---|---|---|
| 4,156,901 | 5/1979 | Haraden et al. | 362/296 |
| 4,159,517 | 6/1979 | Paradine et al. | 364/200 |
| 4,164,017 | 8/1979 | Randall | 364/200 |
| 4,191,996 | 3/1980 | Chesley | 364/200 |
| 4,208,715 | 6/1980 | Kumahara et al. | 364/200 |
| 4,228,503 | 10/1980 | Waite et al. | 364/200 |
| 4,257,009 | 3/1981 | Yorkanis | 330/51 |
| 4,270,167 | 5/1981 | Koehler et al. | 364/200 |
| 4,282,572 | 8/1981 | Moore, III et al. | 364/200 |
| 4,318,173 | 3/1982 | Freedman et al. | 364/200 |
| 4,332,027 | 5/1982 | Malcolm et al. | 370/94 |
| 4,351,023 | 9/1982 | Richer | 364/187 |
| 4,358,823 | 11/1982 | McDonald et al. | 364/200 |
| 4,359,718 | 11/1982 | Payen | 340/825.03 |
| 4,371,754 | 2/1983 | De et al. | 179/18 EE |
| 4,378,588 | 3/1983 | Katzman et al. | 364/200 |
| 4,380,047 | 4/1983 | Eisenhard et al. | 364/200 |
| 4,380,067 | 4/1983 | Beardsley et al. | 371/11 |
| 4,402,046 | 8/1983 | Cox et al. | 364/200 |
| 4,403,286 | 9/1983 | Fry et al. | 364/200 |
| 4,403,303 | 9/1983 | Howes et al. | 364/900 |
| 4,423,414 | 12/1983 | Bryant et al. | 340/825.07 |
| 4,428,044 | 1/1984 | Liron | 364/200 |
| 4,430,699 | 2/1984 | Segarra et al. | 364/200 |
| 4,434,487 | 2/1984 | Rubinson et al. | 371/10 |
| 4,439,859 | 3/1984 | Donnan | 371/32 |
| 4,445,214 | 4/1984 | Reynolds et al. | 370/94 |
| 4,453,215 | 6/1984 | Reid | 364/200 |
| 4,455,601 | 6/1984 | Griscom et al. | 364/200 |
| 4,455,645 | 6/1984 | Mijioka et al. | 370/16 |
| 4,459,658 | 7/1984 | Gabbe et al. | 364/200 |
| 4,471,429 | 9/1984 | Porter et al. | 364/200 |
| 4,477,882 | 10/1984 | Schumacher et al. | 364/900 |
| 4,477,895 | 10/1984 | Casper et al. | 370/16 |
| 4,479,214 | 10/1984 | Ryan | 371/11 |
| 4,480,304 | 10/1984 | Carr et al. | 364/200 |
| 4,483,001 | 11/1984 | Ryan | 371/11 |
| 4,484,275 | 11/1984 | Katzman et al. | 364/200 |
| 4,486,826 | 12/1984 | Wolff et al. | 364/200 |
| 4,498,145 | 2/1985 | Baker et al. | 364/900 |
| 4,507,751 | 3/1985 | Gawlick et al. | 364/900 |
| 4,516,121 | 5/1985 | Moriyama et al. | 340/825.05 |
| 4,521,847 | 6/1985 | Ziehm et al. | 364/184 |
| 4,530,051 | 7/1985 | Johnson et al. | 364/200 |
| 4,530,052 | 7/1985 | King et al. | 364/200 |
| 4,562,535 | 12/1985 | Vincent et al. | 364/200 |
| 4,581,701 | 4/1986 | Hess et al. | 364/187 |
| 4,583,089 | 4/1986 | Cope | 340/825.05 |
| 4,589,090 | 5/1986 | Downing et al. | 364/900 |
| 4,590,554 | 5/1986 | Glazer et al. | 364/200 |
| 4,604,690 | 8/1986 | Crabtree | 64/200 |
| 4,607,365 | 8/1986 | Greig et al. | 371/8 |
| 4,608,688 | 8/1986 | Hansen et al. | 371/11 |
| 4,610,013 | 9/1986 | Long et al. | 371/9 |
| 4,615,001 | 9/1986 | Hudgins et al. | 364/200 |
| 4,623,883 | 11/1986 | Konen | 340/825.01 |
| 4,628,508 | 12/1986 | Sager et al. | 371/9 |
| 4,630,224 | 12/1986 | Sollman | 364/550 |
| 4,639,852 | 1/1987 | Motomiya | 364/138 |
| 4,639,856 | 1/1987 | Hrustich et al. | 364/200 |
| 4,644,470 | 2/1987 | Feigenbaum et al. | 364/200 |
| 4,646,300 | 2/1987 | Goodman et al. | 371/33 |
| 4,648,031 | 3/1987 | Jenner | 364/200 |
| 4,648,061 | 3/1987 | Foster | 264/900 |
| 4,652,940 | 3/1987 | Sumiyoshi | 360/5 |
| 4,654,819 | 3/1987 | Stiffler | 364/900 |
| 4,654,846 | 3/1987 | Goodwin et al. | 371/8 |
| 4,654,857 | 3/1987 | Samson et al. | 371/68 |
| 4,656,596 | 4/1987 | Thaden et al. | 364/521 |
| 4,674,038 | 6/1987 | Brelsford et al. | 364/200 |
| 4,680,581 | 7/1987 | Kozlik et al. | 340/825.06 |
| 4,691,314 | 9/1987 | Bergins et al. | 370/94 |
| 4,703,421 | 10/1987 | Abrant et al. | 364/200 |
| 4,703,481 | 10/1987 | Fremont | 371/12 |
| 4,713,811 | 12/1987 | Frey | 371/9 |
| 4,727,516 | 2/1988 | Yoshida et al. | 365/200 |
| 4,736,339 | 4/1988 | Crabbe, Jr. | 364/900 |
| 4,740,969 | 4/1988 | Fremont | 371/12 |
| 4,750,177 | 6/1988 | Hendrie et al. | 371/32 |
| 4,754,397 | 6/1988 | Varaiya et al. | 364/200 |
| 4,800,488 | 1/1989 | Agrawal et al. | 364/200 |
| 4,823,256 | 4/1989 | Bishop et al. | 364/200 |
| 4,866,707 | 9/1989 | Marshall et al. | 370/94.1 |
| 4,878,167 | 10/1989 | Kapulka et al. | 364/200 |
| 4,941,087 | 7/1990 | Kap | 364/200 |
| 4,953,122 | 8/1990 | Williams | 364/900 |
| 4,959,768 | 9/1990 | Gerhart | 364/187 |
| 4,959,774 | 9/1990 | Davis | 364/200 |
| 4,979,108 | 12/1990 | Crabbe, Jr. | 364/200 |
| 5,005,122 | 4/1991 | Griffin et al. | 364/200 |
| 5,038,278 | 8/1991 | Steely, Jr. et al. | 395/460 |
| 5,060,185 | 10/1991 | Naito et al. | 364/900 |
| 5,079,740 | 1/1992 | Patel et al. | 364/900 |
| 5,086,502 | 2/1992 | Malcolm | 395/575 |
| 5,123,099 | 6/1992 | Shibata et al. | 395/425 |
| 5,157,663 | 10/1992 | Major et al. | 371/9.1 |
| 5,235,700 | 8/1993 | Alaiwan et al. | 395/575 |
| 5,276,867 | 1/1994 | Kenley et al. | 395/600 |
| 5,295,258 | 3/1994 | Jewett et al. | 395/575 |
| 5,307,481 | 4/1994 | Shimazaki et al. | 395/575 |
| 5,343,477 | 8/1994 | Yamada | 371/8.2 |
| 5,403,639 | 4/1995 | Belsan et al. | 395/600 |
| 5,410,667 | 4/1995 | Belsan et al. | 395/441 |
| 5,426,747 | 6/1995 | Weinreb et al. | 395/413 |
| 5,435,004 | 7/1995 | Cox et al. | 395/600 |
| 5,455,932 | 10/1995 | Major et al. | 395/489 |
| 5,513,314 | 4/1996 | Kandasamy et al. | 395/182.04 |
| 5,515,502 | 5/1996 | Wood | 395/182.13 |
| 5,530,855 | 6/1996 | Satoh et al. | 395/600 |
| 5,537,533 | 7/1996 | Staheli et al. | 395/182.03 |
| 5,537,585 | 7/1996 | Blickenstaff et al. | 395/600 |
| 5,544,347 | 8/1996 | Yanai et al. | 395/489 |

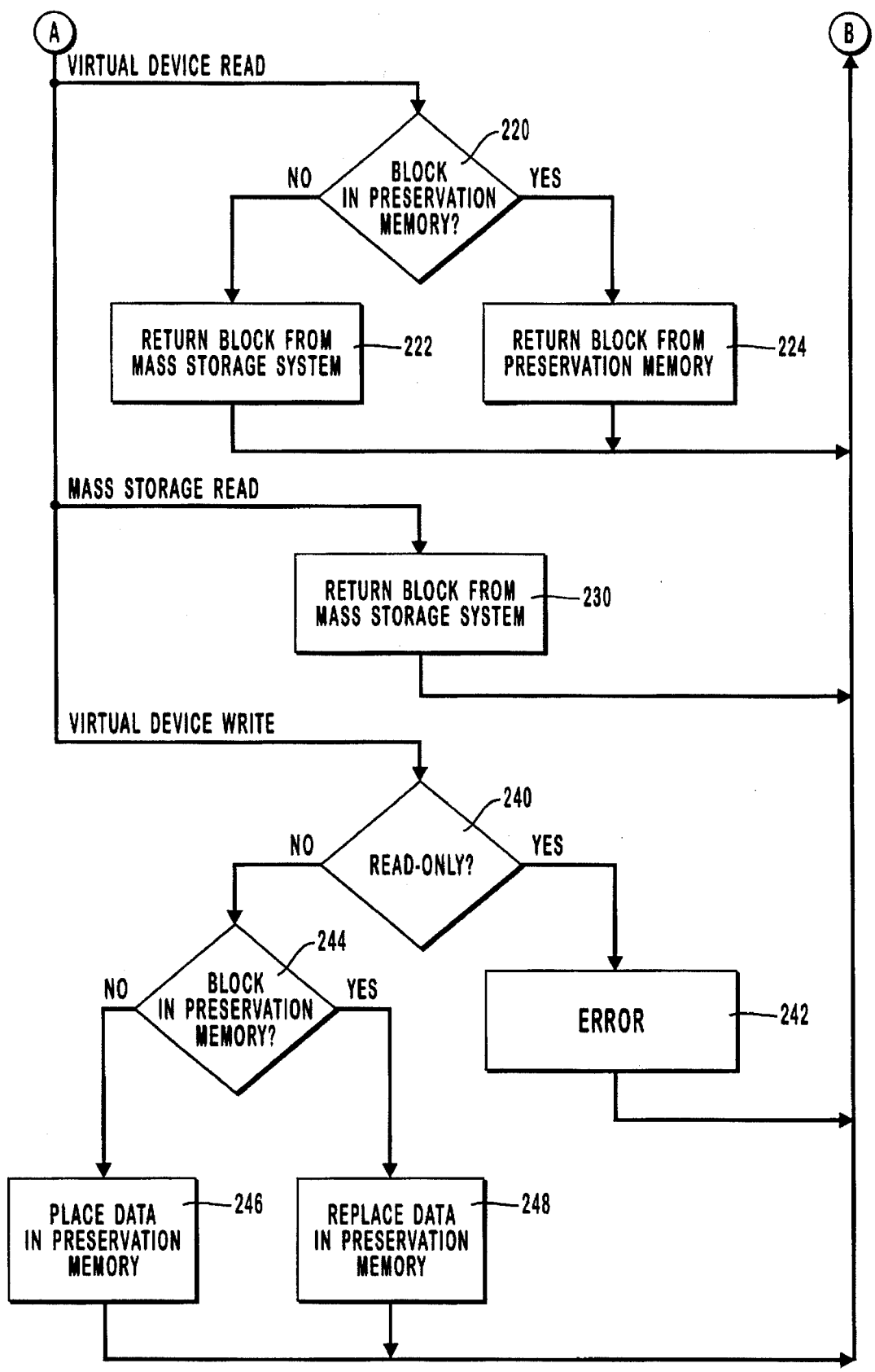
FIG. 2 [CON'T]

METHOD AND SYSTEM FOR PROVIDING A STATIC SNAPSHOT OF DATA STORED ON A MASS STORAGE SYSTEM

MICROFICHE APPENDIX

This specification includes a MICROFICHE APPENDIX which is intended to be a part of the disclosure herein. The MICROFICHE APPENDIX contains 2 pages of microfiche and a total of 105 frames. The MICROFICHE APPENDIX includes computer source code used in the implementation of one preferred embodiment of the invention.

BACKGROUND OF THE INVENTION

1. Field of the Invention

This invention relates to mass storage systems for digital computers, and in particular to a method for providing a static snapshot or image of a mass storage system.

2. Description of Related Art

It is desirable during the operation of a computer system with a mass storage system, such as a magnetic disk, to periodically make a backup copy of the data stored on the mass storage system to allow for recovery in the event of a failure of the mass storage system. This is commonly done by reading the data stored on the mass storage system and writing it to a magnetic tape.

However, if the data stored on the mass storage system is being updated by other programs as the backup copy is being made, the image of the data on the mass storage system written to tape may be inconsistent. This is because normal backup techniques either copy the blocks from the mass storage system sequentially to the linear-access tape, or walk the file system stored on the mass storage system, starting with the first block of the first file in the first directory and proceeding in order to the last block of the last file of the last directory. The backup program is not aware of updates performed to a block of the mass storage system after that block has been written to tape.

This problem of inconsistent data being written to tape is particularly likely to occur if the mass storage system is being used by a database management system, where an update may involve changing information stored on different parts of the mass storage system. If a database update is made while the backup tape is being written, the image of the database management system written to tape will have the old values for any data already written to tape at the time of the database update, and the new values for any data written to tape following the database update. A restoration based on the tape image of the database would yield an inconsistent database.

Horton et al., U.S. Pat. No. 5,089,958, which is hereby incorporated by reference in its entirety for the material disclosed therein, discloses a technique for producing an image of a mass storage system at any point in time after the technique is started. This is done by establishing a base image of the mass storage system at the start of the technique and a log indicating each change made to the mass storage system. An image at any point in time can then be produced by starting with the base image and making all the changes indicated in the log up to that point in time. To improve performance, the Horton system also provides for differential images so that the compilation of changes to form an image does not have to start with the base image.

There are two difficulties with using the technique of Horton to provide an image for backup operations. First, the technique is not designed to provide a static snapshot or image of the mass storage system, but to allow an image from any point in time to be created at some later time. This increases the complexity of the technique and requires the compilation of changes whenever a virtual image is desired.

The second difficulty with using the technique of Horton is that the log must store a copy of each change made to the mass storage system in order to produce an image of the mass storage system as it was at a specified time. This means that the size of the log can grow without bound, eventually exhausting the space available for its storage. At this point, updates to the mass storage system are not possible without compromising the ability to produce an image from any previous point in time.

With many database systems or file systems, certain key blocks (such as master directory blocks) are frequently updated, perhaps with every update to any other block. A copy of these blocks must be written to the log each time they are changed. This will, of course, result in a very large log file, with many of the entries being copies of the key blocks as they changed over time.

Another approach to creating a static image of a mass storage system is possible if the mass storage system has the ability to produce a mirror, or identical copy, of one disk's data on a second disk. At the time the static image is needed, mirroring of data is stopped and the mirror disk is used as the static image. When the static image is no longer necessary (for example, when the tape backup has been completed), the two disks are resynchronized, by copying any changes made during the time mirroring was not active to the mirror disk, and mirroring is resumed.

This approach also has problems. Unless there are three or more disks mirroring the information on the main disk, when mirroring is stopped to produce the static image there is no longer the redundancy of mirrored disk or disks and updates can be lost if there is a disk failure. Furthermore, it requires an entire disk to be devoted to the storage of the static image.

But the major disadvantage of this mirror disk approach is the time necessary to restart mirroring after the static image is no longer needed. This requires updating the mirror disk with all the changes that have been made since mirroring was stopped. If a log of these changes is not available, this means that all the data on the mirror disk must be copied from the disk which has been updated. For large disks such as would be found on a database system, this could take many hours.

SUMMARY OF THE INVENTION

It is an object of this invention to provide a static image of data stored on a mass storage system as it existed at a particular point in time.

This is accomplished by creating a virtual device that will appear as a mass storage device containing the static image. Write operations to the mass storage system are also intercepted by the method. Copies of blocks on the mass storage system are placed in a preservation memory whenever they are going to be changed by a write operation, unless an entry for that block is already in the preservation memory. During a read of the virtual device, the preservation memory is first checked, either directly or using a table of contents of the preservation memory, to see if it contains a copy of the block from the specified location. If the preservation memory has such a copy, that copy is returned as the result of the read. Otherwise, the block is read from the mass storage system.

It is a further object of the invention to reduce the amount of storage required to provide the static image. The technique of Horton requires the storage of all changes from the time the technique is started. The mirror disk technique requires storage equal to the size of the mass storage being imaged. In contrast, the method of the invention only requires storage equal to the number of mass storage blocks that have been changed since the static image was created.

It is a further object of the invention to reduce the time necessary for generating the static image and for returning to normal operation when the static image is no longer needed. Unlike the technique of Horton, where the static image at a particular time needs to be compiled from the base image and log entries, all that is necessary for creating a static image using the method of this invention is to create the virtual device and establish the interception of writes to the mass storage system. No copying of data or compilation of an image is necessary.

When the static image is no longer necessary, the virtual device is removed from the system and the contents of the preservation memory deleted if recovery of that space is desirable. No synchronization to the mass storage system is necessary nor is it necessary to merge updates into a base image to create a new base image.

These and other features of the invention will be more readily understood upon consideration of the attached drawings and of the following detailed description of those drawings and the presently preferred embodiments of the invention.

DETAILED DESCRIPTION OF THE INVENTION

Figure 1:
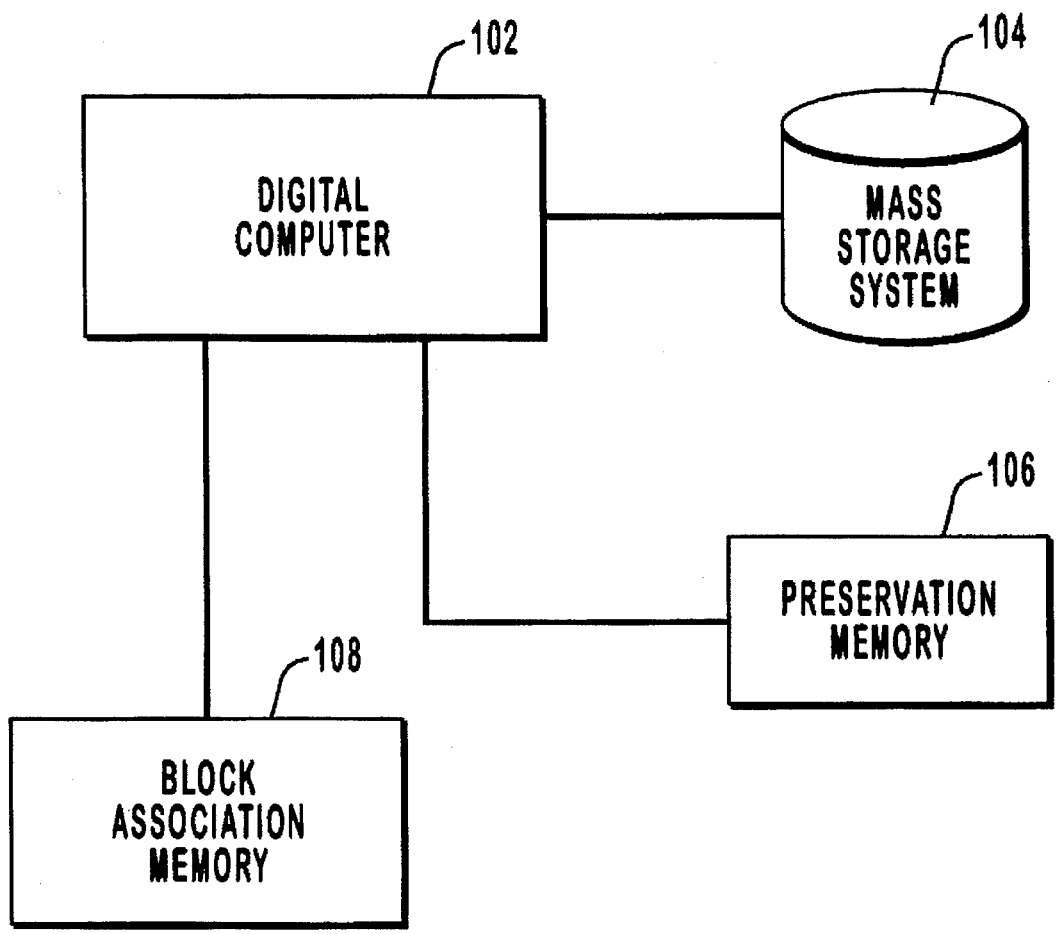
FIG. 1 is a block diagram of a representative digital computer configuration on which the preferred embodiment of the invention operates.

Referring to FIG. 1, which illustrates a representative computer configuration on which the method of the invention runs, it can be seen that digital computer 102 has connected to it mass storage system 104 and preservation memory 106. In some embodiments of the invention, association memory 108 may also be connected to digital computer 102.

Mass storage system 104 can be any writable block-addressable storage system, such as one or more disks or a partition of a disk. (If mass storage system 104 were not writable, such as a CD-ROM, its contents would not change and there would be no need for the invention of this application.) A partition of a disk can be a fixed area of a disk. The disks can store their information using magnetic, optical, or any other technique that allows writing and reading of data without departing from the scope and spirit of this invention.

In the currently-preferred embodiment of the invention, digital computer 102 is a PC-compatible computer based on an Intel X86 series or compatible processor and mass storage device 104 is a SCSI or IDE magnetic disk connected to digital computer 102 through an appropriate controller.

Preservation memory 106 can be an area in the random-access memory (RAM) of digital computer 102, one or more disks, a partition of a disk, or a file stored on a disk. Optimal selection of the implementation of preservation memory 106 depends of the number of blocks of the mass storage system that will be changed during the time the static image is needed. The use of RAM provides faster performance, but may limit the number of entries in the preservation memory. If the preservation memory runs out of space when a new entry must be stored, the method fails and the static image is no longer available or remains in the state it was at the time the preservation memory ran out of space. It is important to note that if this occurs, no data from the mass storage, system is lost, and the method can be restarted to produce a new static image.

Figure 2:
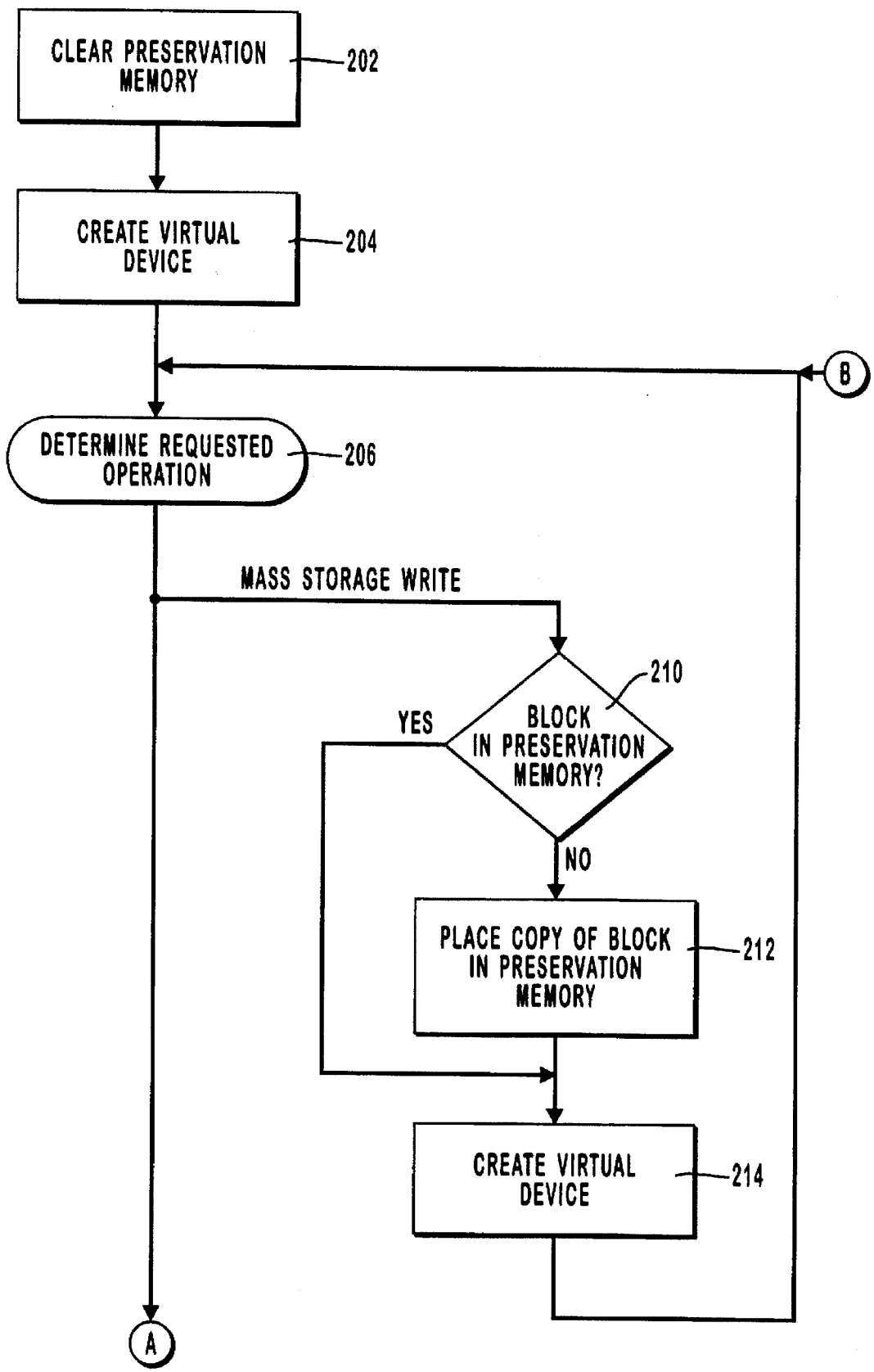
FIG. 2 is a flow diagram showing the preferred steps of the method of the invention.

Referring to FIG. 2, which is a flow diagram showing the steps of the method, the method starts at step 202 when a static image of the mass storage system is desired. This can be indicated by the running of a special program, an operating system call, or an operator command, as appropriate for the operating system and application.

In step 202, preservation memory 106 is cleared. In general, this will consist of setting the control information describing the contents of preservation memory 106 to indicate that there are no valid entries in preservation memory 106.

In step 204, a virtual device appearing as a mass storage device is created. The method for creating a virtual device will depend on the particular operating system running on digital computer 102, but will be known by one skilled in the art of that particular operating system. In addition, it may be necessary in step 204 to configure the operating system so that the method of this invention intercepts any read or write operation directed to mass storage system 104. Again, how this is done will be dependent on the particular operating system running on digital computer 102.

In step 206, the method waits until there is a write operation directed to mass storage system 104 or a read operation directed to the virtual device created in step 204. In variants of the method, step 206 also reacts to a read operation directed to mass storage system 104 or a write operation directed to the virtual device created in step 204.

If the operation is a write to mass storage system 104, step 210 is entered. Using the mass storage write address specified in the write operation, step 210 determines if there is a block of data associated with that mass storage write address in preservation memory 106. If there isn't, step 212 of the method is executed. Otherwise, step 212 is skipped and step 214 is executed.

There are a number of ways for determining whether there is a block of data associated with the mass storage address in the preservation memory 106. In the currently-preferred embodiment of the invention, there is a block association memory 108 also connected to digital computer 102. (Block association memory 108 may be a separate memory connected to digital computer 102, or may be a portion of the RAM of digital computer 102.) Block association memory 108 is used to associate blocks stored in preservation memory 106 with the unique addresses of blocks on mass storage system 104. Block association memory 108 does this by containing entries indicating a unique address and the location in preservation memory 106 for the block associated with that unique address.

Entries in block association memory 108 can be stored unordered, in which case they must be linearly searched for a matching unique address. If no entry is found with a matching address, there is not a block in preservation memory 106 associated with that address. Alternatively, the entries could be stored ordered by unique addresses, in which case a binary search could be used to locate the matching entry in block association memory 108. A hashing scheme could also be used to find a matching entry.

The block association memory 108 can also be organized as an array with an element for each unique address of mass storage system 104. Each element of the array stores a preservation memory location, or a special value that indicates that there is not a block in preservation memory 106 associated with that unique address.

The selection of a technique for storing entries in block association memory 108 depends on the characteristics of accessing the entries. Using an array provides the highest speed for accessing an entry or adding an entry corresponding to a block just copied into preservation memory 106, at the expense of a large block association memory 108. Ordering the entries by unique address provides faster access than for unordered entries, but requires more time when an entry is added to block association memory 108. In the currently-preferred embodiment, entries are stored unordered in block association memory 108.

In this discussion, the term block refers to the data stored at a particular location in mass storage system 104 or preservation memory 106. Blocks are generally of a fixed size (e.g. 512 bytes for disks used with MS-DOS), although blocks of different sizes, or variable sizes, are within the scope of this invention. On mass storage system 104, each block has a unique address, specified in read or write operations. A block in preservation memory 106 is a copy of a block of data stored in mass storage system 104, and that block in preservation memory 106 is associated with the unique address of the block in mass storage system 104 of which it is a copy.

For efficiency, it may be convenient to treat one or more contiguous blocks on mass storage system 104 as if it were a single, large block. Often operating systems perform their mass storage operations on contiguous blocks (called clusters in MS-DOS). The extensions to handle clusters of blocks should be clear to one with ordinary skills in computer programming.

If block association memory 108 is being used, step 202 (clearing preservation memory 106) consists of removing all entries from block association memory 108 or setting them to the special entry that indicates that there is no block in preservation memory 106 associated with each unique address.

Returning to FIG. 2, step 212 is executed if there is not a block associated with the mass storage write address in preservation memory 106. Step 212 places a copy of the block of data currently located at the mass storage write address in preservation memory 106, updating block association memory 108 as necessary. It is important to note that step 212 will be executed at most once for each unique address on mass storage system 104, since the next time step 210 tests to see if there is a block in preservation memory 106 associated with that mass storage write address it will find the copy made by step 212. Because of this, preservation memory 106 will contain only copies of blocks as they were when the method was started.

In step 214, the data to be written by the mass storage write operation is written to the location on mass storage system 104 specified by the mass storage write address. This completes the steps for a mass storage write, and step 206 is reentered to wait for the next operation.

If the operation is a virtual device read, step 220 is entered. Again, a check is made to determine if a block associated with the virtual device read address is in preservation memory 106. If there is such a block, step 224 is executed. If not, step 222 is executed.

Step 222 returns the data from the block in mass storage system 104 specified by the virtual device read address as the result of the read operation. Step 224 returns the block from preservation memory 106 associated with the virtual address read address as the result of the read operation. This completes the steps for a virtual device read, and step 206 is reentered to wait for the next operation.

If the operation is a mass storage read, step 230 is entered, which returns the data from the block of mass storage system 104 specified by the mass storage read address as the result of the read operation. This completes the steps for a mass storage read, and step 206 is reentered to wait for the next operation.

It may be desirable to allow write operations to the virtual device, changing the image as specified by the write operations. For example, it may be necessary to write a different label or other control information on the virtual device image so the operating system can differentiate it from mass storage system 104.

If the operation is a virtual device write, step 240 is entered. Step 240 checks to see if the virtual device is read-only, and if it is step 242 is entered to return an appropriate error indication to the operating system or user.

Step 244 checks to determine if a block associated with the virtual device write address is in preservation memory 106. If there is such a block, step 248 is executed. If not, step 246 is executed. In step 246, the data from the virtual device write operation is placed in preservation memory 106, associated with the virtual device write address from the virtual device write operation. Block association memory 108 is updated as necessary. In step 248, the data from the virtual device write operation replaces the block associated with the virtual device write address of the virtual device write operation. This completes the steps of the virtual device write, and step 206 is reentered to wait for the next operation.

While the description above describes the basic operation of the method of the invention, there are a number of other embodiments possible. For example, the same preservation memory 106 can be shared so that a second virtual device provides a snapshot image of a second mass storage system. In another embodiment, a second preservation memory and second virtual device can be used to provide a second image whose snapshot was taken at a different time of mass storage system 104.

Figure 3:
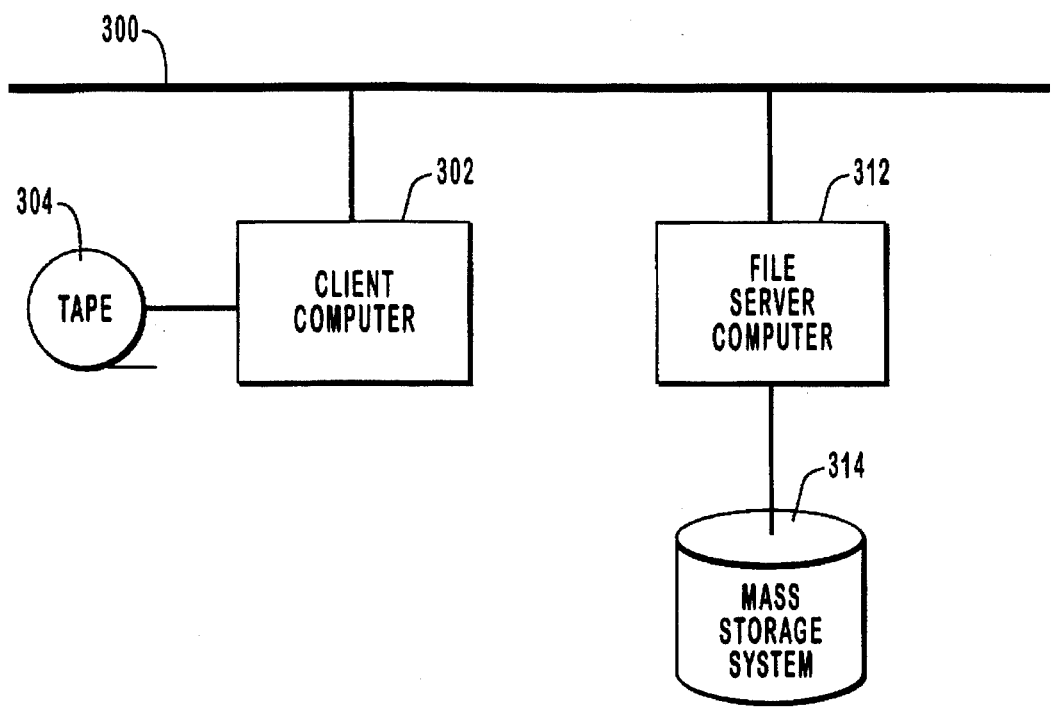
FIG. 3 is a block diagram of a client-server configuration using the preferred method.

The computer system running the method of the invention can also be used as a file server for client computers connected to it by a network or other means. As a file server, it can export its mass storage system, the virtual device created by the method, or both. Such a system is illustrated in FIG. 3.

File server computer 312, with mass storage system 314, runs the method of the invention. It exports the virtual device (and probably mass storage system 314) to client computer 302, communicating over network 300. Computer 302 can run a tape backup program that copies the information from the exported virtual device to tape drive 304. No change is necessary for the tape backup program running on client computer 302, which sees the virtual device as just another mass storage device.

Figure 4:
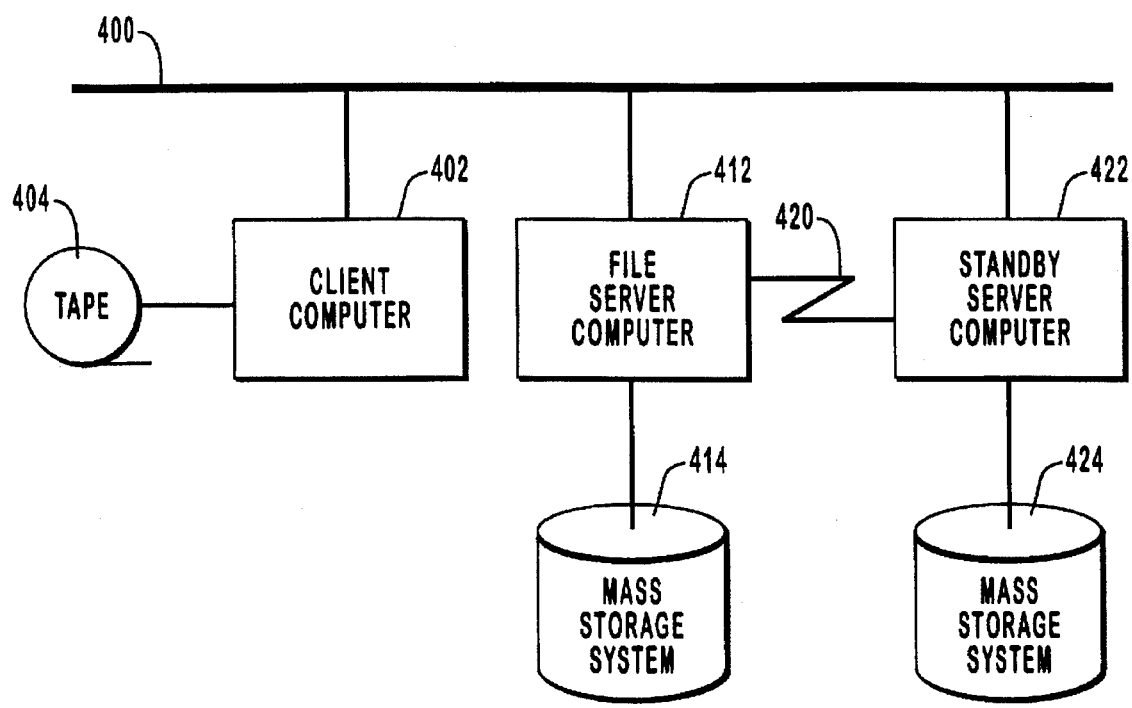
FIG. 4 is a block diagram of the currently-preferred embodiment of the method in a client-server configuration.

FIG. 4 illustrates the currently-preferred configuration for running the method of the invention. Network 400 connects client computer 402, with tape drive 404, to file server computer 412, with mass storage system 414. File server computer communicates with standby server computer 422 over data link 420. Standby server computer 422 has mass storage system 424. Through software running on file server computer 412 and standby server computer 422, as described in U.S. patent application Ser. No. 08/094,744, filed on Jul. 20, 1993 and entitled "METHOD FOR RAPID RECOVERY FROM A NETWORK FILE SERVER FAILURE" (which is hereby incorporated by reference in its entirety), mass storage system 424 appears as a disk to file server computer 412 and mirrors the data on mass storage system 414. In the event of a failure of either file server computer 412 or mass storage system 414, standby computer 422 can be restarted as the file server.

In the configuration of FIG. 4, standby server 422 runs the method of the invention, and can export the virtual device either to file server computer 412, which can then export it to client computers on network 400, or standby server 422 can directly export the virtual device to client computers. The virtual device can also be accessed by programs running on standby server 422.

Figure 5:
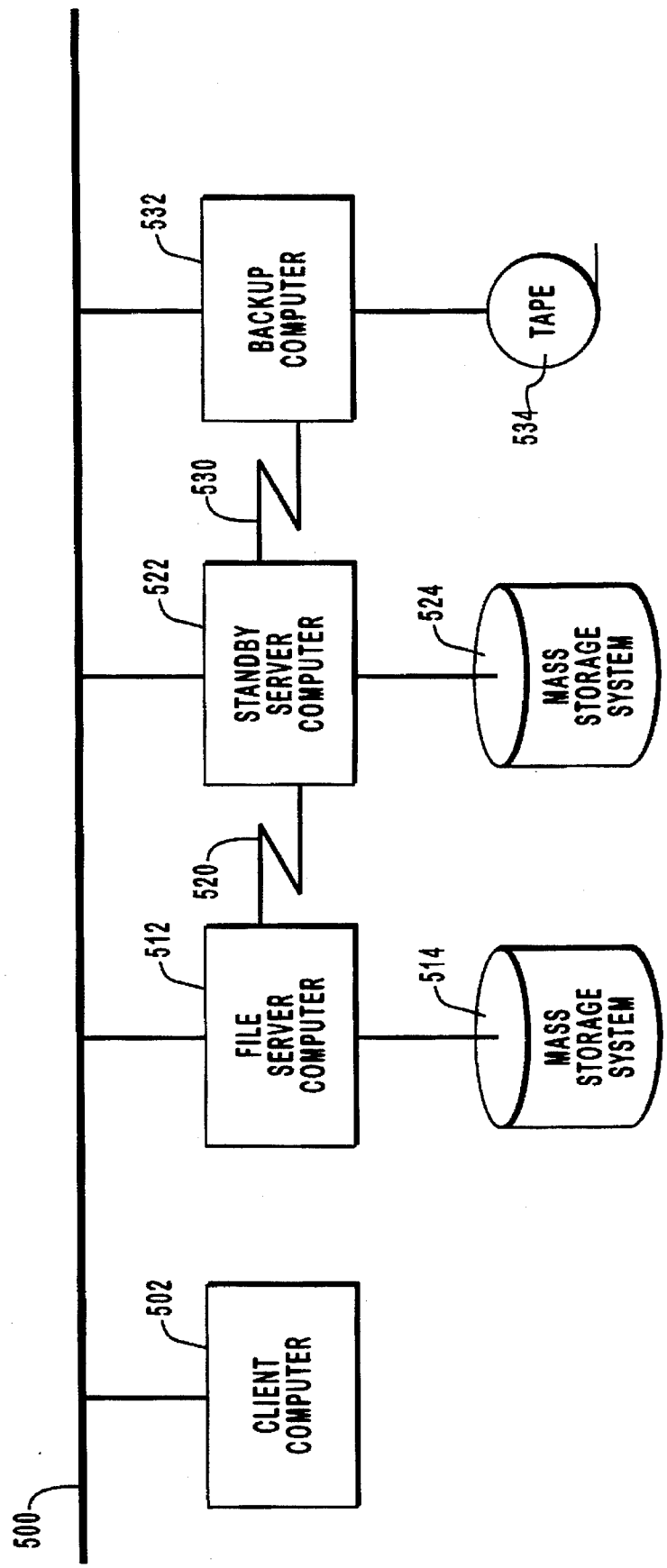
FIG. 5 is variant of the configuration of FIG. 4.

FIG. 5 illustrates a variant of the configuration of FIG. 4. Instead of client computer 502 having a tape drive, as was the case for client computer 402, backup computer 532 has tape drive 534. Backup computer 532 communicates with standby server computer 522 over data link 530. Standby server computer exports mass storage system 524 to file server computer 512 (whether mirrored or not). Standby server computer exports the virtual device with the snapshot image of mass storage system 524 to backup computer 532.

Backup computer 532 can now copy the snapshot image of mass storage system 524 by reading the virtual device exported to it by standby server computer 522. Neither file server computer 512 nor standby server computer 522 has the overhead of the tape backup process, which can result in a degradation of performance if data compression needs to be performed before the data is written to tape. Also, a fault in the tape backup program will not affect either file server computer 512 or standby server computer 522.

It is to be understood that the above described embodiments are merely illustrative of numerous and varied other embodiments which may constitute applications of the principles of the invention. Such other embodiments may be readily devised by those skilled in the art without departing from the spirit or scope of this invention and it is our intent they be deemed within the scope of our invention.

We claim:

1. A method for providing a static snapshot of data used by a computer configuration including:
 a digital computer executing the steps of the method;
 a mass storage system connected to said digital computer, said mass storage system storing blocks of data each located at a unique mass storage write address; and
 a preservation memory connected to said digital computer and used for storing a copy of any of said blocks of data, each of said copies being associated with one of said unique addresses;
the method comprising the steps of:
 (A) clearing said preservation memory so that no copies of blocks of data are in said preservation memory;
 (B) creating a virtual device;
 (C) whenever a write operation to said mass storage system occurs, and said write operation specifies one of said unique write addresses for receiving at that unique address of the mass storage system a new block of data to be written to said mass storage system, then
  (1) if and only if there is not already found within the preservation memory a copy of a block of data associated with said unique mass storage write address, then placing in said preservation memory a copy of the block of data located in said mass storage system at said unique mass storage write address prior to writing the new block of data in said mass storage system at that same address; and
  (2) writing said new block of data to said mass storage system at the location specified by said unique mass storage write address only after the preceding step (1) has been performed at least once for a given unique mass storage write address; and
 (D) whenever a read operation to said virtual device occurs, and said read operation specifies a virtual device read address, then
  (1) if there is not a copy of a block of data associated with said virtual device read address in said preservation memory, then returning in response to said read operation said block of data associated with said virtual read address from said mass storage system; and
  (2) if there is a copy of a block of data associated with said virtual device read address in said preservation memory, then returning in response to said read operation said copy of the block of data associated with said virtual device read address in said preservation memory.

2. A method as in claim 1, wherein said mass storage system comprises one or more disks.

3. A method as in claim 1, wherein said mass storage system is a partition of a disk.

4. A method as in claim 1, wherein said preservation memory is a random-access memory.

5. A method as in claim 1, wherein said preservation memory is one or more disks.

6. A method as in claim 1, wherein said preservation memory is a partition of a disk.

7. A method as in claim 1, wherein said preservation memory is a file stored on mass storage system.

8. A method as in claim 1 further comprising the steps of:
 (E) whenever a write operation to said virtual device occurs, and said write operation specifies a virtual device write address and a new block of data to be written to said virtual device, then
  (1) if there is not a copy of a block of data associated with said virtual device write address in said preservation memory, placing in said preservation memory said new block of data to be written to said virtual device; and
  (2) if there is a copy of a block of data associated with said virtual device write address in said preservation memory, replacing in said preservation memory said copy of the block of data associated with said virtual device write address with said new block of data to be written to said virtual device.

9. A method as in claim 1 further comprising the steps of:
 (E) whenever a read operation to said mass storage system occurs, and said read operation specifies a unique mass storage read address, then returning as the result of said read operation a block of data located in said mass storage system at said unique mass storage read address.

10. A method as in claim 1, said computer configuration further including a block association memory, said block association memory used to associate said copies of blocks stored in said preservation memory with said unique addresses.

11. A method as in claim 10, wherein said block association memory contains entries, each entry indicating a unique address in said mass storage system and a location in said preservation memory of a copy of a block associated with said unique address.

12. A method as in claim 11, wherein said copies of blocks of data in said preservation memory are associated with a unique address by searching said block association memory entries for a matching address.

13. A method as in claim 12, wherein there is not a copy of a block of data associated with an address if there is no entry in said block association memory with a matching address.

14. A method as in claim 11, wherein said block association memory contains an entry for each unique address in said mass storage system.

15. A method as in claim 14, where a special value for said preservation memory location in one of said entries indicates that there is not a copy of a block of data in said preservation memory associated with the unique address indicated by said one of said entries.

16. A method as in claim 1, wherein said digital computer acts as a file server, and said virtual device is exported to other computers.

17. A method as in claim 16, wherein said mass storage system is exported to other computers.

18. A method as in claim 1, said computer configuration further including a second mass storage system storing blocks of data each located at a unique storage write address, and the method further comprising the steps of:
 (E) creating a second virtual device in addition to the virtual device created in step (B);
 (F) whenever a write operation to said second mass storage system occurs, and said write operation specifies a unique mass storage write address of the second mass storage system and a new block of data to be written to said second mass storage system, then
  (1) if and only if there is not already found within the preservation memory a copy of a block of data associated with said unique mass storage write address of the second mass storage system, then placing in said preservation memory a copy of the block of data located in said second mass storage system at said unique mass storage write address of the second mass storage system; and
  (2) writing said new block of data to said second mass storage system at the location specified by said unique mass storage write address of the second mass storage system only after the preceding step (F)(1) has been performed at least once for a given unique mass storage write address of the second mass storage system; and
 (G) whenever a read operation to said second virtual device occurs., and said read operation specifies a second virtual device read address, then
  (1) if there is not a copy of a block of data associated with said second virtual device read address in said preservation memory, then returning in response to said read operation said block of data associated with said second virtual device read address from said second mass storage system; and
  (2) if there is a copy of a block of data associated with said second virtual device read address in said preservation memory, then returning in response to said read operation said copy of the block of data associated with said second virtual device read address in said preservation memory.

19. A method as in claim 1, said computer configuration further including a second preservation memory, and the method further comprising the steps of:
 (E) creating a second virtual device in addition to the virtual device created in step (B);
 (F) whenever a write operation to said mass storage system occurs, and said write operation specifies a unique mass storage write address and a new block of data to be written to said unique mass storage system, then
  (1) if and only if there is not already found within the second preservation memory a copy of a block of data associated with said unique mass storage write address, then placing in said second preservation memory a copy of the block of data located in said mass storage system at said unique mass storage write address; and
  (2) writing said new block of data to said mass storage system at the location specified by said unique mass storage write address only after the preceding step (F)(1) has been performed at least once for a given unique mass storage write address; and
 (G) whenever a read operation to said second virtual device occurs, and said read operation specifies a second virtual device read address, then
  (1) if there is not a copy of a block of data associated with said second virtual device read address in said second preservation memory, then returning in response to said read operation said block of data associated with said second virtual read address from said mass storage system; and
  (2) if there is a copy of a block of data associated with said second virtual device read address in said second preservation memory, then returning in response to said read operation said copy of the block of data associated with said second virtual device read address in said second preservation memory.

20. A system for providing a static snapshot of data comprising:
 a mass storage system for storing blocks of data each located at a unique mass storage write address;
 a preservation memory used for storing a copy of any of said blocks of data, each of said copies being associated with one of said unique addresses; and
 a digital computer connected to said mass storage system and to said preservation memory, said digital computer being programmed so as to comprise:
 (A) means for clearing said preservation memory so that no copies of blocks of data are in said preservation memory;
 (B) means for creating a virtual device;
 (C) means for creating a static snapshot of the data blocks of said mass storage system whenever a write operation to said mass storage system occurs, and said write operation specifies one of said unique write addresses for receiving at that unique address of the mass storage system a new block of data to be written to said mass storage system, by performing the steps of:
  (1) if and only if there is not already found within the preservation memory a copy of a block of data associated with said unique mass storage write address, then placing in said preservation memory a copy of the block of data located in said mass storage system at said unique mass storage write address prior to writing the new block of data in said mass storage system at that same address; and (2) writing said new block of data to said mass storage system at the location specified by said unique mass storage write address only after the preceding step (1) has been performed at least once for a given unique mass storage write address; and (D) means for outputting data blocks of the static snapshot whenever a read operation to said virtual device occurs, and said read operation specifies a virtual device read address, by performing the steps of:

(1) if there is not a copy of a block of data associated with said virtual device read address in said preservation memory, then returning in response to said read operation said block of data associated with said virtual read address from said mass storage system; and (2) if there is a copy of a block of data associated with said virtual device read address in said preservation memory, then returning in response to said read operation said copy of the block of data associated with said virtual device read address in said preservation memory.

21. A method for providing a static snapshot of data used by a computer configuration including:

a digital computer executing the steps of the method;

a mass storage system connected to said digital computer, said mass storage system storing blocks of data each located at a unique mass storage write address; and a preservation memory connected to said digital computer and used for storing a copy of any of said blocks of data, each of said copies being associated with one of said unique addresses;

the method comprising the steps of:

(A) clearing said preservation memory so that no copies of blocks of data are in said preservation memory;

(B) creating a virtual device;

(C) whenever a write operation to said mass storage system occurs, and said write operation specifies one of said unique write addresses for receiving at that unique address of the mass storage system a new block of data to be written to said mass storage system, then (1) if and only if there is not already found within the preservation memory a copy of a block of data associated with said unique mass storage write address, then placing in said preservation memory a copy of the block of data located in said mass storage system at said unique mass storage write address prior to writing the new block of data in said mass storage system at that same address; and (2) writing said new block of data to said mass storage system at the location specified by said unique mass storage write address only after the preceding step (1) has been performed at least once for a given unique mass storage write address; and (D) whenever a read operation to said virtual device occurs, and said read operation specifies a virtual device read address, then (1) if there is not a copy of a block of data associated with said virtual device read address in said preservation memory, then returning in response to said read operation said block of data associated with said virtual read address from said mass storage system;

(2) if there is a copy of a block of data associated with said virtual device read address in said preservation memory, then returning in response to said read operation said copy of the block of data associated with said virtual device read address in said preservation memory;

(E) whenever a write operation to said virtual device occurs that specifies a virtual device write address and data to be written, performing the following:

(1) if there is not a copy of a block of data associated with said virtual device write address in said preservation memory, placing in said preservation memory said new block of data to be written to said virtual device; and (2) if there is a copy of a block of data associated with said virtual device write address in said preservation memory, replacing in said preservation memory said copy of the block of data associated with said virtual device write address with said new block of data to be written to said virtual device; and (F) whenever a read operation to said mass storage system occurs, and said read operation specifies a unique mass storage read address, then returning as the result of said read operation a block of data located in said mass storage system at said unique mass storage read address.

22. A system for providing a static snapshot of data comprising:

digital computer for executing the steps Of a programmable method;

a mass storage system connected to said digital computer, said mass storage system storing blocks of data each located at a unique mass storage write address; and a preservation memory connected to said digital computer and used for storing a copy of any of said blocks of data, each of said copies being associated with one of said unique addresses;

and wherein the programmable method is comprised of the steps of:

(A) clearing said preservation memory so that no copies of blocks of data are in said preservation memory;

(B) creating a virtual device;

(C) whenever a write operation to said mass storage system occurs, and said write operation specifies one of said unique write addresses for receiving at that unique address of the mass storage system a new block of data to be written to said mass storage system, then (1) if and only if there is not already found within the preservation memory a copy of a block of data associated with said unique mass storage write address, then placing in said preservation memory a copy of the block of data located in said mass storage system at said unique mass storage write address prior to writing the new block of data in said mass storage system at that same address; and (2) writing said new block of data to said mass storage system at the location specified by said unique mass storage write address only after the preceding step (1) has been performed at least once for a given unique mass storage write address; and (D) whenever a read operation to said virtual device occurs, and said read operation specifies a virtual device read address, then (1) if there is not a copy of a block of data associated with said virtual device read address in said preservation memory, then returning in response to said read operation said block of data associated with said virtual read address from said mass storage system;

(2) if there is a copy of a block of data associated with said virtual device read address in said preservation memory, then returning in response to said read operation said copy of the block of data associated with said virtual device read address in said preservation memory;

(E) whenever a write operation to said virtual device occurs, and said write operation specifies a virtual device write address and a new block of data to be written to said virtual device, then
   (1) if there is not a copy of a block of data associated with said virtual device write address in said preservation memory, placing in said preservation memory said new block of data to be written to said virtual device; and
   (2) if there is a copy of a block of data associated with said virtual device write address in said preservation memory, replacing in said preservation memory said copy of the block of data associated with said virtual device write address with said new block of data to be written to said virtual device; and (F) whenever a read operation to said mass storage system occurs, and said read operation specifies a unique mass storage read address, then returning as the result of said read operation a block of data located in said mass storage system at said unique mass storage read address.

23. In a computer system having a processor, a mass storage system for storing blocks of data in response to write operations, and a preservation memory means, a method of providing a static snapshot of the mass storage system at a particular point in time so that said static snapshot does not change even though the contents of said mass storage system change, the method comprising the steps of:

clearing the preservation memory means so that the preservation memory means is ready to preserve data blocks of said mass storage system:

preserving a snapshot of the mass storage system at a particular point in time by executing at least the following steps:
   (1) when a data block is to be over-written by a new data block at said same write address, checking said preservation memory means to determine if the data block specified by said address has already been stored in the preservation memory means;
   (2) if and only if said data block has already been stored in said preservation memory means, performing the over-write operation so that said new data block replaces the data block at said address; and
   (3) if the data block that is to be overwritten has not been already stored in said preservation memory means, preserving the data block by first copying said data block into said preservation memory means prior to performing the over-write operation, thereby permitting said mass storage system to be updated as each data block is preserved at a given snapshot moment in the preservation memory means.

24. A system for providing a static snapshot of a mass storage system at a particular point in time so that said static snapshot does not change even though the contents of said mass storage system subsequently change, said system comprising:

a mass storage system for storing a plurality of data blocks, each of said plurality of data blocks being specified by a unique write address;

preservation memory means for storing the data blocks of said mass storage system so as to store a static snapshot of the mass storage system at a particular point in time; and processor means for (1) identifying whether each data block of said mass storage system has been preserved in said preservation memory means, for (2) ensuring that each data block of said mass storage system is copied to said preservation memory means the first time said data block is to be over-written by a new data block when said static snapshot of said mass storage system is taken, and for (3) writing a new data block to said mass storage system without first preserving said data block if said data block has already been preserved in said preservation memory means.

25. An article of manufacture for use in a computer system comprising a processor, a mass storage means and a preservation memory means, said article of manufacture comprising:

a computer readable medium for storing programmable code means thereon to be executed by said processor: and programmable code means stored on said computer readable medium for causing said processor to perform at least the following steps when the computer readable medium is used to program said processor;

(A) clearing the preservation memory means so that the preservation memory means is ready to preserve data blocks of said mass storage system;

(B) preserving each original data block which exists at a given snapshot moment and which is specified by a write address on said mass storage system by executing at least the following steps:
   (1) when an original data block is to be over-written by a new data block at said same write address, checking said preservation memory means to determine if the original data block specified by said address has already been stored in the preservation memory means;
   (2) if and only if said original data block has already been stored in said preservation memory means, performing the over-write operation so that said new data block replaces the data block at said address; and
   (3) if the original data block that is to be overwritten has not been already stored in said preservation memory means, preserving the original data block by first copying said original data block into said preservation memory means prior to performing the over-write operation, thereby permitting said mass storage system to be updated as each original data block is preserved at a given snapshot moment in the preservation memory means.

* * * * *

UNITED STATES PATENT AND TRADEMARK OFFICE
CERTIFICATE OF CORRECTION

PATENT NO. : 5,649,152
DATED : July 15, 1997
INVENTOR(S) : Richard S. Ohran; Michael R. Ohran It is certified that error appears in the above-identified patent and that said Letters Patent is hereby corrected as shown below:

Col. 1, line 38, "that" should be --the--

Col. 2, line 32, "three" should be --two--

Col. 4, line 11, delete the comma after "storage"

Col. 6, line 63, "Just" should be --just--

Col. 9, line 54, "occurs.," should be --occurs,--

Col. 12, line 23, "Of" should be --of--

Signed and Sealed this

Fifteenth Day of September, 1998

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,649,152

DATED : July 15, 1997

INVENTOR(S) : Richard S. Ohran; Michael R. Ohran

It is certified that error appears in the above-identified patent and that said Letters Patent is hereby corrected as shown below:

Col. 1, line 38, after "after" change "that" to --the--

Signed and Sealed this

Seventeenth Day of November, 1998

Attest:

BRUCE LEHMAN

*Attesting Officer*  *Commissioner of Patents and Trademarks*